Feb. 13, 1968  D. L. OTTO  3,368,819

DUAL FACE ROTARY SHAFT SEAL ASSEMBLY

Filed Feb. 3, 1965  3 Sheets-Sheet 1

INVENTOR:
DENNIS L. OTTO
BY Gravely, Lieder & Woodruff
ATTORNEYS.

Feb. 13, 1968  D. L. OTTO  3,368,819

DUAL FACE ROTARY SHAFT SEAL ASSEMBLY

Filed Feb. 3, 1965  3 Sheets-Sheet 2

INVENTOR:
DENNIS L. OTTO
BY Gravely, Lieder & Woodruff
ATTORNEYS,

Feb. 13, 1968  D. L. OTTO  3,368,819
DUAL FACE ROTARY SHAFT SEAL ASSEMBLY
Filed Feb. 3, 1965  3 Sheets-Sheet 3

INVENTOR:
DENNIS L. OTTO
BY Gravely, Lieder & Woodruff
ATTORNEYS.

United States Patent Office 3,368,819
Patented Feb. 13, 1968

3,368,819
DUAL FACE ROTARY SHAFT SEAL ASSEMBLY
Dennis L. Otto, Canton, Ohio, assignor to The Timken
Roller Bearing Company, Canton, Ohio, a corporation
of Ohio
Filed Feb. 3, 1965, Ser. No. 429,972
2 Claims. (Cl. 277—25)

ABSTRACT OF THE DISCLOSURE

A dual face rotary shaft seal assembly including a stationary casing housing a sealing member mounted for rotation with a shaft, and in which the sealing member carries sealing elements projecting adjacent the interior walls of the casing and spring means which force the sealing elements into sealing engagement with the casing under initial tension so that during rotation the spring means can maintain equalizing force on the sealing elements.

This invention relates to shaft seals and more particularly to rotary shaft seals having dual faces. More specifically, the invention affords a unitized dual face rotary shaft seal.

Many and varied seals have been previously designed for long term sealing of rotary shafts, but most suffer from various undesired features such as leakage from speed, vibration, eccentricity, etc., inability to be interchanged among various rotary shafts having different operating conditions, and pressure blowout, among others.

The dual face rotary seal appertaining to the invention avoids previous problems associated with rotary shaft seals and provides a simple, easy to manufacture, unitized dual face rotary seal. Briefly, the seal appertaining to the invention includes a rotating ring member having dual faces that are biased into engagement with seal element case walls. The ring member is press fitted to the rotary shaft being sealed and rotates therewith or may be fitted to a seal wear ring carried by the rotary shaft, whereas the seal element case is press fitted into a housing referred to often hereinafter as the outer seal case. Several embodiments are disclosed herein, however, all employ the basic rotating ring member, and stationary seal element case with the ring member supporting seal faces biased into engagement with the case.

Basically, the operation of the dual face rotary shaft seal consists of the ring member and seal faces rotating with the shaft and biased against the sides of the stationary case. The biasing elements afford counterreaction force to self-align the seal and to equalize pressure exerted on the seal.

It is, therefore, an important object of the invention to provide a dual face, rotary shaft seal which is simple to provide a dual face, rotary shaft seal which is simple and easy to construct and is readily adapted to seal various rotary shafts regardless of operating variable.

It is another object of the invention to provide a dual face, unitized rotary shaft seal which is simple and easy to construct and which is adapted to self-align to various rotary shafts regardless of operating speed, vibration, eccentricity, etc.

It is another object of the invention to provide a dual face, unitized rotary shaft seal which is simple and easy to construct and is readily adapted for attachment to seal wear rings which may be affixed to various rotary shafts regardless of operating variables.

It is another object of the invention to provide a dual face, unitized rotary shaft seal for attachment to a seal wear ring mounted on a rotary shaft, such seal being self-aligning.

It is another object of the invention to provide a dual face, unitized rotary shaft seal having a ring member with a dual face which rotates with the rotary shaft and which is positively biased into sealing engagement with walls of a stationary seal case and adapted to equalize the seal force between the dual faces.

It is another object of the invention to provide a dual face rotary shaft seal that includes a ring member having dual faces which rotates with the rotary shaft, the dual faces being spring loaded and engaging a stationary element case of the seal with equal force.

It is another object of the invention to provide a dual face rotary shaft seal wherein the seal is made by a ring member press fitted to a rotary shaft and carries dual seal faces biased against the sealing surfaces of a stationary element case for the shaft seal such that any force tending to create unequal sealing force between the dual faces is countervailed by the biasing means.

It is yet another object of the invention to provide a unitized, dual face rotary shaft seal wherein the dual seal faces are Teflon that join a ring member affixed to rotate with the rotary shaft and that engage the walls of a stationary element case for the shaft seal, the dual faces being biased outward from said ring member by means which afford equalizing reaction to maintain self-aligning of the seal and equal sealing force between the dual faces.

It is another object of the invention to provide a unitized, dual face rotary shaft seal wherein the dual seal faces are Teflon that engage a ring member affixed to a seal wear ring mounted on a rotary shaft and rotate therewith, and that engage the walls of a stationary element case for the shaft seal, the dual faces being biased outward from said ring member by means which afford equalizing reaction to maintain self-alignment of the seal and equal sealing forces between the dual faces.

It is yet another object of the invention to provide a dual face unitized rotary shaft seal wherein the shaft seal includes a resilient ring member affixed to the rotary shaft that has dual faces of a low friction material, a seal element case surrounding said ring member, and reaction means biasing each of said dual faces against opposing walls of said element case, said element case adapted to be press fitted into an outer seal case and said ring member adapted to be press fitted on a rotary shaft.

It is a further object of the invention to provide a unitized, dual sealing rotary shaft seal including a ring member having a pair of inclined peripheral surfaces terminating in a peripheral rib, a seal element case surrounding said ring member, an accurate Teflon shoe element attached and centered along said peripheral rib and abutting opposing walls of said element case, and a spring coil seated along each of the pair of inclined peripheral surfaces biasing the sides of said shoe elements outward against said element casing and creating equalizing forces against said inclined peripheral surfaces of said ring member.

It is yet a further object of the invention to provide a unitary dual sealing rotary shaft seal including a molded ring member defining a central hub with inclined faces and with an axial bore having annular grooves and defining a pair of rolled flanges extending from said inclined faces forming flange lips therewith and forming face seal elements, an O-ring retained within said annular grooves for sealing said ring member to a rotary shaft, a casing surrounding said ring member, and coil springs seated against said inclined faces biasing said face seal elements against opposing walls of said element case and affording equalizing forces to self-align said ring member.

It is yet a further object of the invention to provide a unitized, dual sealing rotary shaft seal including a ring member defining a grooved axial bore and a central peripheral flange, O-ring seal elements retained within the grooves of said axial bore, a seal element case surrounding said ring member, Teflon arcuate ring seals attached to said peripheral flange and seated against opposing walls of said element case, spring members including backing washers for said ring seals seated on opposing sides of said peripheral flange for biasing said ring seals against said element case and balancing the reaction force on said peripheral flange.

It is yet a further object of the invention to provide a unitized, dual sealing rotary shaft seal including a ring member defining a grooved axial bore and a central peripheral flange, O-ring seal elements retained within the groove of said axial bore and seated about a seal wear ring secured to a rotary shaft, dual Teflon shoe seals engaging opposed walls of said element case and dual finger spring members concentric with the Teflon shoe seals for biasing said shoe seals against said element case and balancing the reaction force on said ring member said shoe seals and said finger spring members secured along both sides of said peripheral flange.

These and other objects and advantages of the invention will be best understood and appreciated from the appended claims and the ensuing detailed description when taken in conjunction with the drawings wherein:

Figure 1:
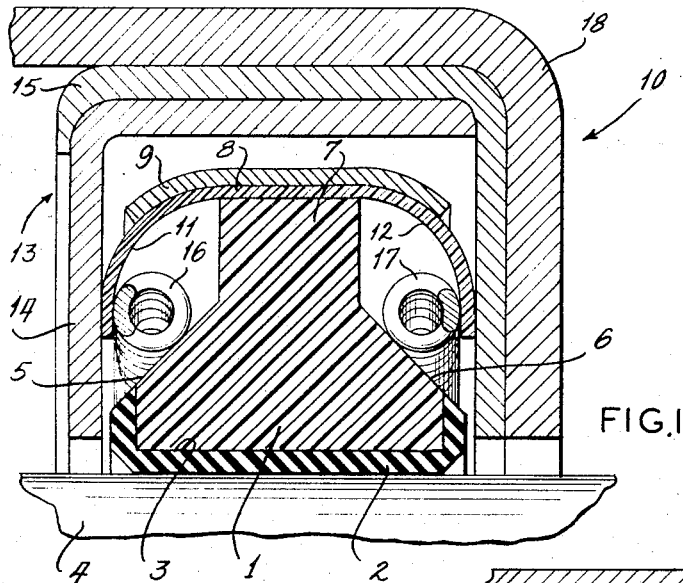
FIG. 1 depicts an embodiment appertaining to the invention utilizing a bonded sleeve rotary shaft sealing element.

Referring to FIG. 1, unitized seal 10 has a ring member 1 having resilient shaft sleeve 2 bonded to axial bore 3. Sleeve 2 is force fitted to rotary shaft 4. Ring member 1 has inclined surfaces or faces 5 and 6 and peripheral rib 7. A Teflon seal element 8 is retained about rib 7 by retainer ring 9. The seal element 8 has opposing walls 11 and 12. A stationary seal element case 13 is formed from cups 14 and 15. Coil spring 16 seats against surface 5 and biases will 11 against the side wall of cup 14, and coil spring 17 seats against surface 6 and biases wall 12 against the side wall of cup 15. Element case 13 affords unitized construction holding all the components properly arranged such that the rotary seal is handled as a single unit. Case 13 is adapted to press fit into shaft housing 18. The unitized rotary seal may be pushed onto a rotary shaft in either direction and may be installed in housing 18 before, during or after installation to shaft 4.

In operation and during installation, springs 16 and 17 expand and contract depending on forces causing springs 16 and 17 to move up or down inclined surfaces 5 and 6. The springs equalize the force against faces 5 and 6, and thus maintain proper alignment of ring member 1. Also, springs 16 and 17 bias walls 11 and 12 into sealing engagement with the walls of cups 14 and 15, respectively. Pressure from either side of seal member 10 is equalized by reaction of springs 16 and 17 moving along inclined surfaces 5 and 6, respectively. Hence, the operation of springs 16 and 17 always maintains excellent sealing with low frictional engagement between stationary and rotary members.

Figure 2:
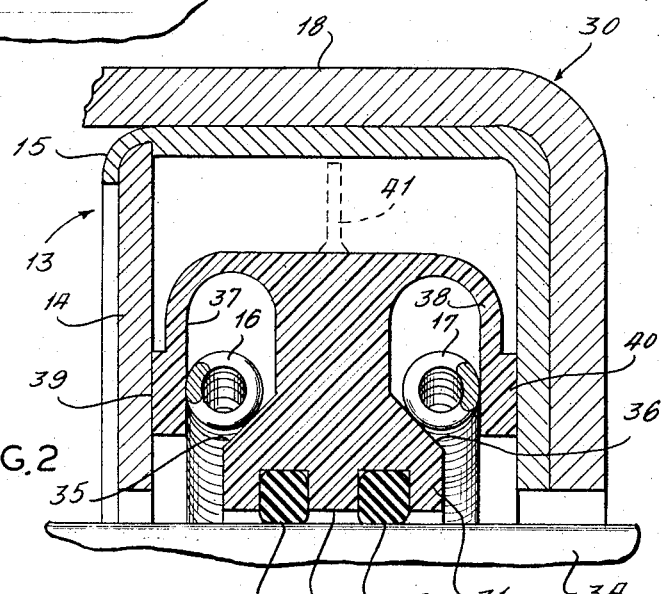
FIG. 2 depicts an embodiment of the invention utilizing O-ring rotary shaft sealing elements.

Referring now to FIG. 2, unitized seal 30 has a ring member 31 defining grooved axial bore 32 which seats O-rings 33 that seal against rotary shaft 34 and rotate ring member 31 therewith. Ring member 31 has inclined faces or surfaces 35 and 36 and flanges 37 and 38 which terminate in face seals 39 and 40, respectively. Optionally, positioning rib 41 may be molded on ring member 31. The rib 41 is provided to centrally locate the member 31 in the stationary casing 13 during assembly. Seal element case 13 (the same as in FIG. 1) is formed of cups 14 and 15. Coil springs 16 and 17 seat against inclined faces 35 and 36, respectively, and bias face seals 39 and 40 into sealing engagement with the inner walls of cups 14 and 15. The function and operation of unitized seal 30 is substantially identical to that of unitized seal 10. Further, springs 16 and 17 function as thrust members preventing member 31 from engaging internal face of case 13. Preferably, face seals 39 and 40 are Teflon for very low friction contact with case 13.

Figure 3:
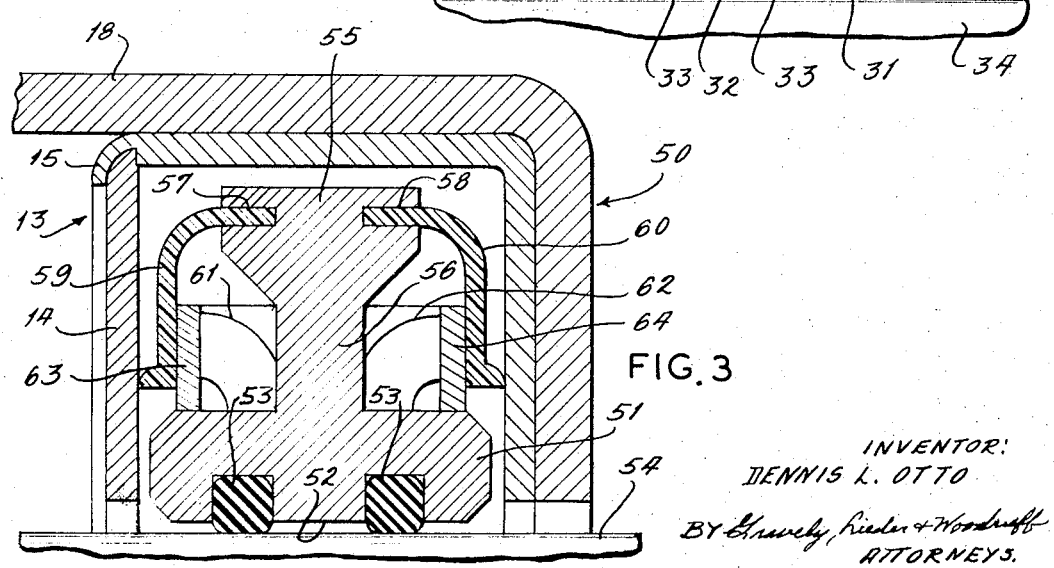
FIG. 3 illustrates an embodiment of the invention using Teflon arcuate ring seal elements and O-ring seal elements.

In FIG. 3, unitized seal 50 has ring member 51 defining grooved axial bore 52 which seats O-rings 53 that seal against rotary shaft 54 and rotate ring member 51 therewith. Ring member 51 has a wheel-shaped peripheral flange or rib 55 which includes thin wall 56 and annular slots 57 and 58. Slot 57 retains arcuate ring seal 59 and slot 58 retains arcuate ring seal 60. Seal element case 13 (identical with FIGS. 1 and 2) is formed of cups 14 and 15. Wave springs 61 and 62 seat against opposite sides of thin wall 56 in ring members 51. Backing washers 63 and 64 seat against wave springs 61 and 62, respectively, affording sealing engagement between ring seal 59 and the wall of cup 14, as well as between ring seal 60 and the wall of cup 15.

In operation and during installation, whenever wave springs 61 and 62 exert unequal force against thin wall 56 the spring with the least compression will yield until the force against thin wall 56 is equalized. Therefore, ring member 51 will always remain aligned and properly seated against shaft 54 since such occurs whenever equal force is applied to opposite sides of thin wall 56.

Figure 4:
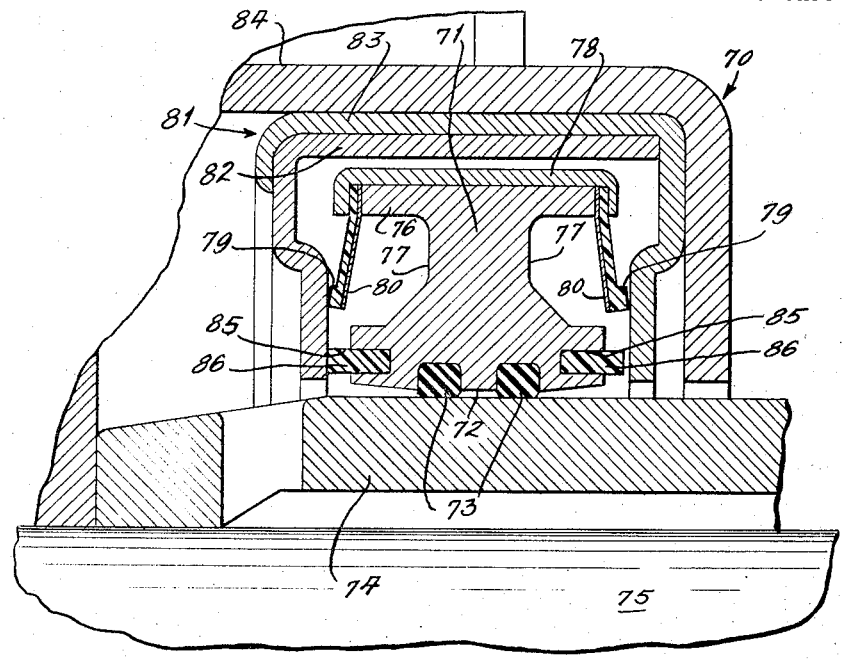
FIG. 4 illustrates an embodiment of the invention using Teflon seal shoes and finger spring members.

In FIG. 4, unitized seal 70 has a ring member 71, of steel or other suitable material, defining grooved axial bore 72 which seats O-rings 73 that seal against seal wear ring 74. A rotatable shaft 75 carries seal wear ring 74 that rotates with shaft 75. Ring member 71 has a peripheral rim 76 and a pair of axial grooves 77. Retainer ring 78 secures seal shoes 79 and finger springs 80 to the edges of peripheral rim 76 or ring member 71. Seal element case 81 is formed of cups 82 and 83. The inner cup 82 and the outer cup 83 are adapted to be held by press fitting into a housing forming the outer seal case 84. In this arrangement finger springs 80 bias seal shoes 79 preferably made from Teflon into engagement with cups 82 and 83 forming a rotary seal. Axial channels 85 support spacer rings 86, preferably made of Teflon or other low friction material, to provide wear surfaces with limited lateral movement of ring member 71 along the seal wear ring 74. Preferably O-rings 73 seated in grooved axial bore 72 are made of Buna "N" rubber. In the foregoing arrangement of unitized seal 70, it is apparent that during installation and operation seal 70 function quite similarly as unitized seal 50.

Figure 5:
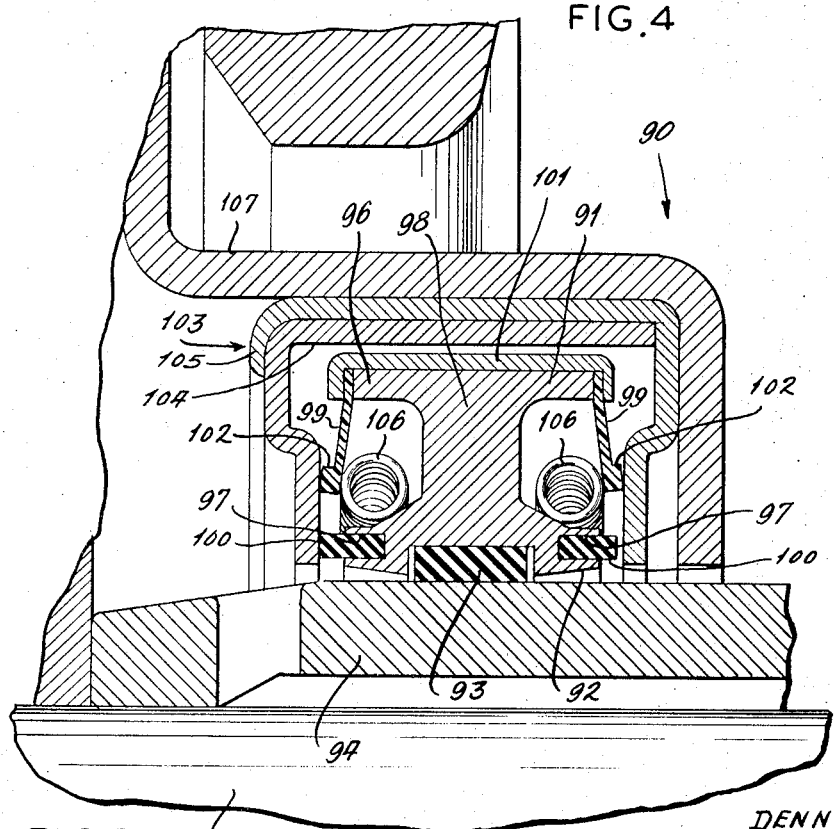
FIG. 5 illustrates another embodiment of the invention using Teflon shoe seals and Teflon spacer members.

Referring now to FIG. 5 unitized seal 90 has a ring member 91, preferably of aluminum, defining grooved axial bore 92 which has boot ring 93 that secures the unitary seal 90 to seal wear ring 94 which is affixed to shaft 95 and rotates therewith. Ring member 91 has a peripheral rim 96, a pair of axial channels 97, and a thin central wall 98 defining a pair of opposed inclined faces 99. Axial channels 97 carry spacer rings 100, preferably of Teflon or other low friction material. Retainer ring 101 secures seal shoes 102, preferably made of Teflon, along the edges or rim 96. Stationary seal element case 103 is formed of cups 104 and 105. A pair of coil or garter springs 106 ride on inclined faces 99 and engage seal shoes 102, similarly as the operation of garter springs 16 and 17 in FIG. 1 and 2, bias seal members against the seal element case. Seal element case 103 is press fitted into outer seal case 107. During installation and operation unitized seal 90 is similar to unitized seal 70 with lateral movement between boot ring 93 and wear ring 94. Spacer rings 100 limit movement and provide wear surfaces.

Figure 6:
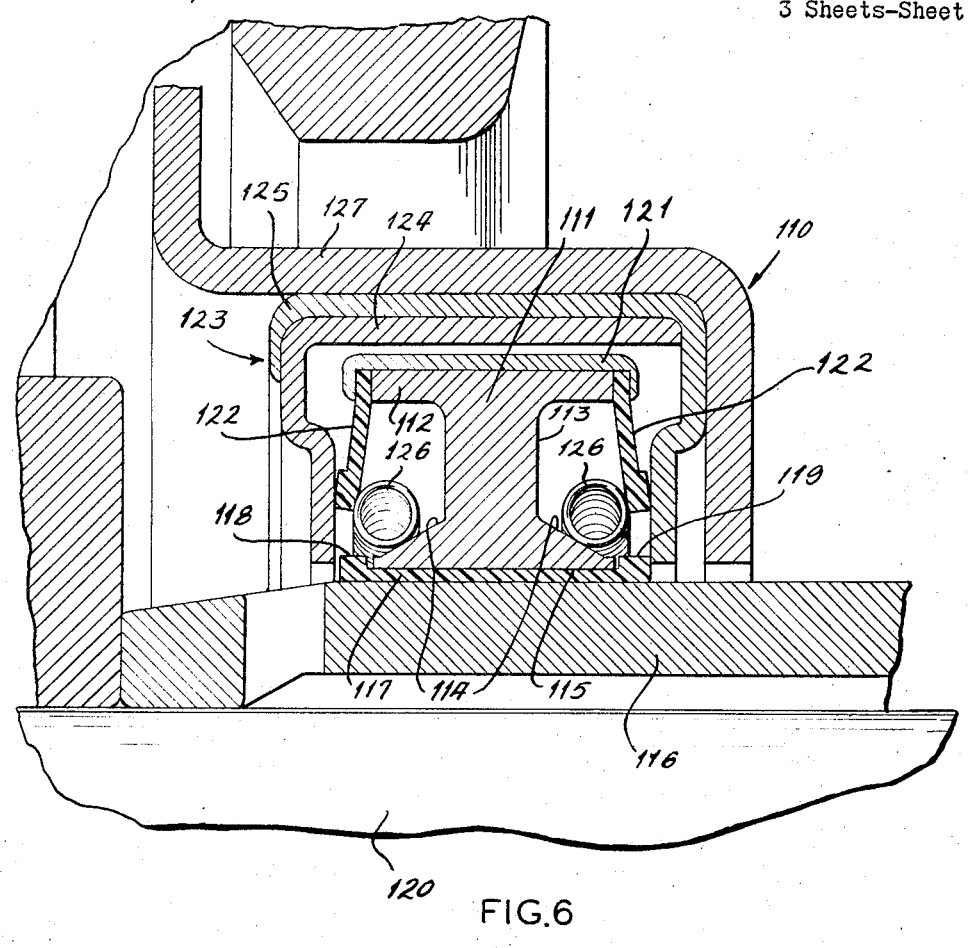
FIG. 6 illustrates an embodiment of the invention using a rubber boot for securing the ring member about the seal wear ring yet permitting lateral motion.

Referring now to FIG. 6, unitized shaft seal 110 has a ring member 111 with a peripheral rim 112 and axial depressions 113 which define opposed inclined surfaces 114. Smooth bore 115 of ring member 111 is seated onto seal wear ring 116 by a low friction boot 117 which has a low friction surface, such as a Teflon coating, and collars 118 and 119. The collars 118 and 119 permit lateral limited motion of ring member 111 with respect to boot 117 and hence seal wear ring 116. The seal wear ring 116 is secured to a rotary shaft 120 and rotates therewith. A retainer ring 121 secures seal shoes 102 along opposed edges of rim 112. A stationary seal element case 123 is formed of cups 124 and 125, and surrounds and encases ring member 111. A pair of garter springs 126 ride on inclined faces 114 of ring member 111 and bias seal shoes 122 against the inner surfaces of seal element case 123. Also, collars 118 and 119 of boot 117 abut cups 124 and 125 of seal element case 123 which prevents slippage of boot 117 from within the seal element case 123. The stationary seal element case 123 is press fitted into outer seal case 127 which is secured by a journal member. Inasmuch as ring member 111 is free to slip on boot 117, the unitized rotary shaft seal may undergo lateral motion between ring member 111 and boot 117 without loss of the shaft seal or movement of boot 117 on seal wear ring 116.

In the invention, ring members 1 and 51 may be of any suitable metal or plastic substance, whereas molded member 31 must be a resilient material, such as preferably Teflon for low friction at the moving interface. Likewise, where Teflon sealing members are used as the rotating seal elements or shoes, the Teflon coats the areas of contact with seal element case 13. Such coating affords very low friction.

There are many advantages of the foregoing disclosed invention among which is the ability for the seal to be used on any rotary shaft without special surface preparation of the shaft or any parts of the seal, particularly the portion of the element case which makes contact with the rotating seal element. Moreover, the unitary seal may be interchanged among various rotary shafts of the same nominal size with no corrective measures necessary.

Furthermore, the unitized seal may be used not only directly secured to a rotary shaft as depicted in FIGS. 1 through 3, but also to a seal wear ring which is adapted to a rotary shaft as depicted in FIGS. 4, 5 and 6. Although several embodiments of the unitized rotary shaft seal are illustrated, they may be readily interchanged and adapted to apply either on a seal wear ring or direct attachment on a rotary shaft.

The foregoing embodiments of the invention may be modified in various other details well known to those skilled in the art and all such changes and modifications are deemed to be within the scope of the invention which is limited solely as necessitated by the scope of the appending claims.

I claim:

1. In a dual face rotary shaft seal assembly, the improvement including a stationary casing having spaced walls directed perpendicularly to the rotary shaft, a ring member press fitted on the rotary shaft to rotate therewith, said ring member being located in said casing between said spaced walls and said ring member having a wide base portion and a narrow radial portion and oppositely directed surfaces at each side in spaced relation from said casing spaced walls, oppositely directed flexible arm means on said narrow radial portion and extending in positions to project toward said spaced walls, sealing elements carried by said arm means in positions extending adjacent each of said casing spaced walls, and a resilient member carried on each of said oppositely directed surfaces of said ring member in position to axially bias and engage said sealing elements, said resilient members being under initial tension to react and exert a continually effective pressure upon said sealing elements to press the latter against said spaced walls, each of said resilient members being free to move relative to said ring surfaces in response to misalignment and pressure differences to a position substantially equalizing the oppositely directed forces of said sealing elements against said spaced walls.

2. The dual face rotary shaft seal assembly set forth in claim 1 wherein said oppositely directed surfaces on said ring member are divergently outwardly sloped toward said spaced walls, and said resilient elements are garter springs.

References Cited

UNITED STATES PATENTS

| | | | |
|---|---|---|---|
| 2,888,281 | 5/1959 | Ratti | 277—25 |
| 3,038,733 | 6/1962 | Hudson et al. | 277—25 X |
| 3,108,815 | 10/1963 | Haynie et al. | 277—37 |
| 3,120,959 | 2/1964 | Jensen et al. | 277—37 |
| 2,747,903 | 5/1956 | Heinrich | 277—61 X |
| 2,877,029 | 3/1959 | Peguet et al. | 227—84 X |

FOREIGN PATENTS

| | | |
|---|---|---|
| 652,295 | 4/1951 | Great Britain. |

SAMUEL ROTHBERG, *Primary Examiner.*